Sept. 22, 1953     B. OSTENDORF, JR     2,653,252
VOLTAGE REGULATOR
Filed July 25, 1951
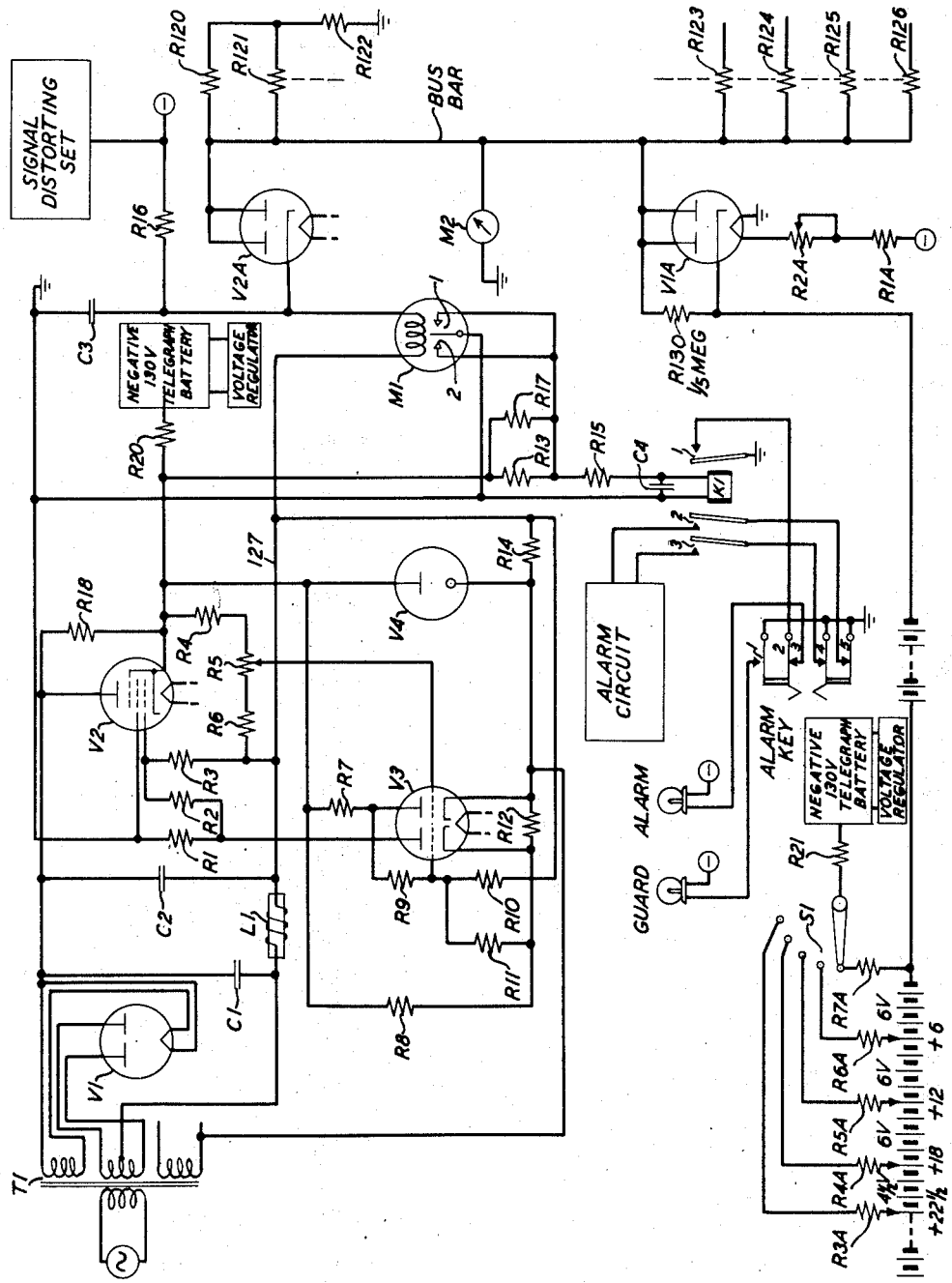
INVENTOR
B. OSTENDORF, JR.
BY
John E. Cassidy
ATTORNEY Patented Sept. 22, 1953

2,653,252

UNITED STATES PATENT OFFICE 2,653,252

VOLTAGE REGULATOR

Bernard Ostendorf, Jr., Stamford, Conn., assignor to Bell Telephone Laboratories, Incorporated, New York, N. Y., a corporation of New York Application July 25, 1951, Serial No. 238,466

5 Claims. (Cl. 307—64)

This invention is an improved power supply circuit comprising a regular and an emergency or standby power source.

The object of the invention is the improvement of power supply circuits particularly such circuits comprising a regular and emergency power source.

The invention may be understood from the following description when read with reference to the associated drawing, which taken together, disclose a preferred embodiment in which the invention is presently incorporated, although it is to be understood that the invention may be incorporated in other embodiments which will be readily suggested to those skilled in the art by the following disclosure.

In the description to follow where values of constants are given it is to be understood that the magnitudes of the constants are cited by way of example only.

First, to describe the invention generally, the present power circuit comprises a regular and an emergency direct-current power source which are connected in parallel to the same bus bar from which bus bar taps are taken off for the various circuits supplied from the present circuit.

In the present instance the power circuit is intended to supply a voltage of negative 330 volts, for instance, to be used primarily in grid biasing circuits in a large telegraph switching center. If supplied entirely from batteries this would require a large number of cells of considerable capacity. It is desirable to employ one of the power sources used in the communication plant, namely the negative 130-volt telegraph supply, to provide part of the required potential for the regular negative 330-volt battery and to add to it a potential of negative 200 volts obtained by transforming and rectifying the 115-volt, 60-cycle commercial power service. The 130-volt telegraph battery is regulated to within plus or minus 5 volts. It is presently employed in a communications office to supply potentials to polar relay telegraph repeaters and, in addition, to various electronic space discharge circuits. It is desirable, as the potential of the 130-volt source varies, varying the potential of the various other elements of the space discharge devices, that the potential of the grid circuits of the same devices vary correspondingly so as to maintain their normal potential relationships. If a portion of the grid circuit potential is made up of a rectified alternating-current commercial potential, which may at times vary widely, the problem of regulation is complicated. In the regular power source portion of the present circuit, as distinguished from the emergency source, the rectified commercial power supply is regulated very closely by an electronic rectifier circuit to be described hereinafter, while the communication power source connected in series with the rectified commercial supply is allowed to vary through its normal regulated range.

The emergency power source of the present circuit is ordinarily employed only infrequently and for short intervals and is not required therefore to have the capacity of the regular power source. It is made up also of two portions. One portion is the same negative 130-volt telegraph battery mentioned in the foregoing. The second portion is a negative nominal 200-volt battery of small capacity, dry cells for instance, connected in series with the telegraph battery. The negative 200-volt battery includes means for cutting in additional cells for regulation as the battery ages.

One of the features of the invention is a novel coupling means whereby the regular voltage source and the emergency voltage source are coupled to the bus bar through isolating diodes which operate automatically in the case of the failure of one power source to connect the other to the bus bar. This will be explained in detail hereunder.

Refer now to the drawing which shows in its upper left-hand portion a commercial power source which may, for instance, be a source of 115-volt, 60-cycle alternating current subject to voltage variation. This voltage is transformed in transformer T1 to 290–0–290 volts. It is rectified full wave by full wave rectifier tube V1 and filtered by capacitance C1, inductance L1 and capacitance C2.

A grounded source of regulated negative 130-volt battery, represented by the designated rectangles, is connected through resistor R20 to the cathode of voltage regular pentode tube V2 and the regular power supply circuit continues to the anode of tube V2 to the cathode of full wave rectifier tube V1 to the anodes thereof, through the upper and lower portions of the middle secondary winding of transformer V1, iductance L1, winding of milliammeter relay M1, through the cathode-anode circuit of diode V2A to the bus bar which is connected through resistors R120 and R121 in parallel and resistor R122 to ground. From the bus bars a large number of taps, represented by those shown extending through resistors R123, R124, R125 and R126 extend to the various individual circuits supplied from the present power plant.

Tubes V2, V3 and V4 act as voltage regulators to maintain a constant output voltage of the rectified supply. The potential on the cathodes of the amplifier tube V3 is held constant with respect to the "—130" lead by means of the voltage regulator tube V4. The voltage on the "output" lead 127 is impressed on the right grid of the amplifier V3 via potential divider consisting of resistors R6, R5 and R4. Any variation of output voltage will be amplified about 25 times on the right plate of double triode amplifier tube V3, and will be of opposite polarity to that of the original variation. The right plate of tube V3 is connected to the left grid of tube V3 via resistor R3, with resistors R10 and R11 providing the proper grid bias. The original variation will be amplified 10 times more by the left section of tube V3 making the total amplification about 250 times. The polarity of the variation on the left plate of tube V3 will be the same as that of the original variation, i. e., an increase in the negative value of the —330 volts will be accomplished by a negative swing on the left plate of tube V3. The grid of the main regulator tube V2 is connected to the left plate of tube V3 via resistor R2. A variation of the grid voltage of tube V2 will increase or decrease the voltage drop from plate to cathode. The over-all action of the regulating circuit is such that a change in output voltage is cancelled out by a nearly equal change in the voltage drop across the series regulator tube V2, resulting in a substantially constant voltage between the —130 volt telegraph battery lead and output lead 127. Any variation in the telegraph battery voltage, however, will appear in the same amount on the output lead for reasons mentioned in the foregoing.

*Alarm circuit*

The output path, as has been shown, extends through the winding of the milliammeter relay M1, which is adjusted to operate when the current is higher or lower than specified limits.

A circuit may be traced from the left-hand terminal of resistor R20 in the negative 130-volt supply lead through resistors R13 and R17 in parallel, resistor R15, and the winding of alarm relay K1, shunted by condenser C4, to ground which holds alarm relay K1 normally operated. If milliammeter relay M1 responds to excessive current, its contact 1 will be closed. If it responds to low current its contact 2 will be closed. The closure of either contact shunts the winding of alarm relay K1 which releases.

The release of relay K1 establishes a circuit from ground through its contact 1, contact 3 of the alarm key and the filament of the alarm lamp lighting the lamp as an indication of the condition. The release of relay K1 by closing its contacts 2 and 3 establishes other circuits from ground through contacts 4 and 5 of the alarm key to activate other audible and visual alarms (not shown). The alarm key may be actuated to its alternate position to extinguish the alarm lamp and cut off the alarm circuit. While in this condition a circuit is established from ground through contact 1 of the alarm key and the filament of the guard lamp, lighting the lamp as an indication that the alarm circuit is disconnected.

*Emergency power source*

The emergency power source comprises the same grounded negative 130-volt telegraph battery, for instance, connected in series through resistor R21 and the rotatable arm of and a particular selected contact of switch S1 to a group, such as five 45-volt dry batteries connected in series. One of these batteries has a plurality of taps, at different voltage points, connected individually through resistors R3A to R7A to the switch contact points. The switch arm may be connected to the different switch points to connect different amounts of this single particular battery in series with four other entire 45-volt batteries in the circuit, as required, to compensate for aging. The series circuit continues through the main portion of the dry cell battery, which may comprise four of the 45-volt units, for instance, and through the cathode-anode circuit of double diode tube V1A to the bus bar. The cathode-anode circuit may be shunted by a resistor of high magnitude such as resistor R130 of one-fifth megohm for instance.

*Isolating circuit*

An important feature of the invention is the isolating circuit comprising the two double diode tubes V1A and V2A which connect the regular and emergency power source individually to the single bus bar. This circuit affords an inexpensive manner of connecting the regular and emergency supply to the bus bar in such manner that only a preferred one of the two sources may be normally effectively connected and so that either may be connected automatically to the bus bar if the other source fails.

The diodes will pass current in only one direction. The one which has the less negative potential on its cathode will pass current. The other will be effectively isolated passing little or negligible current.

In operation the potential of the cathode of tube V1A connected to the small capacity emergency source is adjusted periodically so that it is slightly more positive than the cathode of tube V2A connected to the regular source. Thus the power will normally be supplied from the regular source. If power service fails, or if its potential drops substantially, the potential of the cathode of tube V2A will become more positive than that of the cathode of V1A and the emergency source will be connected into circuit. The transfer to the regular source will be effected similarly when it is again in condition for service.

The function of resistor R18 is to provide a discharge path for condensers C1 and C2 when the rectifier circuit has been disconnected.

In the event vacuum tube V3 or gas tube V4 should, for any reason, fail to perform its function as, for example, if either or both were removed from the circuit, the output voltage would increase. The full amount of the increase would be transmitted to the output bus bar via V2A.

A second regulating feature is provided to keep the voltage increase, caused by a hypothetical failure of V3 or V4, within such limits as will not in turn cause operational failure in the connected load circuits. This regulating feature uses the amplifying ability of V2, the series regulator, by itself, plus making use of the telegraph battery as a voltage standard which is compared with a component of the output voltage fed to the control grid of V2 via resistor R3. In detail, the grid of V2 is supplied potential from resistors R1, R2, and R3. Resistor R1 returns to ground and the cathode of V2 is connected essentially to negative 130-volt telegraph battery; therefore R1 in series with R2 supplies to the grid-cathode circuit of V2 a component of constant positive voltage. If the left triode of V3 fails to draw current because of any trouble condition such as previously hypothecated, then resistors R1 and R2 form a simple series resistance which supplies the grid-cathode circuit of V2 with the aforementioned constant positive voltage component. Resistor R3 supplies the grid-cathode circuit of V2 with a component of negative voltage proportional to the negative output voltage. An increase in negative output voltage causes an increase in negative bias on the control grid of V2, which in turn increases the plate to cathode direct-current resistance and thus tends to counteract the rise in negative output voltage. A decrease in output voltage is counteracted in an opposite manner. Hence the combination of R1, R2, R3, V2, and telegraph battery acts as a voltage regulator, preventing excessive voltage rise in case of the failure of the amplifier circuit associated with V3 and V4.

What is claimed is:

1. In a direct-current power supply circuit, a first potential source and a second potential source, connected in parallel through an individual isolating diode to a common bus bar and means in said circuit, including the relative poling of said rectifiers and their respective response to the relative magnitude of the potentials applied to their terminals, for impressing either of said sources on said bus bar in response to the failure of said other source.

2. A direct-current power supply circuit comprising a first direct-current potential source connected through a first diode and a second direct-current potential source connected through a second diode, each to a common bus bar, said diodes having connections thereto and potentials thereon to normally isolate said first source from said bus bar and connect said first source to said bus bar when said second source fails.

3. A direct-current power supply circuit comprising a first direct-current potential source connected to a first element of a first diode, a second element of said diode connected to a first bus bar, a second direct-current potential source connected to a first element of a second diode, a second element of said second diode connected to said first bus bar, said first elements and said second elements corresponding each to each, said diodes having connections for automatically connecting either of said sources to said bus bar when the other source fails.

4. In a direct-current power supply circuit, a first power supply branch comprising a first potential source, said source a battery, a first potential regulator therefor, a second potential source in series with said first source, said second source a rectified alternating-current potential, a second potential regulator therefor, said regulator an electronic space discharge regulator, said sources connected through a first diode to a first bus bar, a second power supply branch comprising said first potential source and said regulator connected in series with a second battery through a second diode to said first bus bars, said diodes so connected as to effectively isolate one or the other of said branches from said bus bar at any one time, said diodes automatically connecting one of said branches to said bus bar if the other source fails.

5. A direct-current power supply, an electronic voltage regulator therefor, said regulator comprising a first space discharge voltage correcting device having a first set of controls comprising a first input circuit for said correcting device, a second space discharge amplifying device for amplifying voltage changes in said supply and means for applying said amplified changes to said first input circuit, a second voltage regulator for said power supply, said second regulator comprising a second input circuit for said correcting device, and means for effectively establishing said second circuit responsive to the failure of said first regulator.

BERNARD OSTENDORF, Jr.

References Cited in the file of this patent

UNITED STATES PATENTS

| Number | Name | Date |
|---|---|---|
| 2,327,386 | Ashby | Aug. 24, 1933 |
| 2,335,167 | Zierdt | Nov. 23, 1943 |